US010452036B2

(12) United States Patent
Songkakul et al.

(10) Patent No.: US 10,452,036 B2
(45) Date of Patent: Oct. 22, 2019

(54) SYSTEM AND METHOD FOR DETERMINISTIC CALCULATION OF RECOVERY TIME FOR AN ENVIRONMENTAL SYSTEM

(71) Applicant: Siemens Industry, Inc., Alpharetta, GA (US)

(72) Inventors: Pornsak Songkakul, Mequon, WI (US); Michael Pawlowski, Bartlett, IL (US); Chris Casilli, Morriston, FL (US); Osman Ahmed, Hawthorn Woods, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 199 days.

(21) Appl. No.: 15/024,909

(22) PCT Filed: Sep. 11, 2014

(86) PCT No.: PCT/US2014/055164
§ 371 (c)(1),
(2) Date: Mar. 25, 2016

(87) PCT Pub. No.: WO2015/047739
PCT Pub. Date: Apr. 2, 2015

(65) Prior Publication Data
US 2016/0223998 A1 Aug. 4, 2016

Related U.S. Application Data

(63) Continuation-in-part of application No. 14/153,015, filed on Jan. 11, 2014, which is a continuation-in-part of application No. 14/040,214, filed on Sep. 27, 2013.
(Continued)

(51) Int. Cl.
*G05B 15/02* (2006.01)
*H04W 4/021* (2018.01)
(Continued)

(52) U.S. Cl.
CPC ............ *G05B 15/02* (2013.01); *H04L 12/282* (2013.01); *H04L 12/2823* (2013.01);
(Continued)

(58) Field of Classification Search
CPC ........... G05B 15/02; G05B 2219/2642; H04W 4/043; H04W 4/021; H04L 12/2823; H04L 12/282; H04L 2012/2841
See application file for complete search history.

(56) References Cited

U.S. PATENT DOCUMENTS

2004/0133314 A1* 7/2004 Ehlers ................... G06Q 10/10
700/276
2006/0099971 A1 5/2006 Staton et al.
(Continued)

FOREIGN PATENT DOCUMENTS

CN 101103619 A 1/2008
CN 102938927 A 2/2013

OTHER PUBLICATIONS

PCT Search Report for Application No. PCT/US2014/055164, 12 pages.
(Continued)

*Primary Examiner* — Christopher E. Everett (57) ABSTRACT

A method and system of optimally adjusting the environment of a predetermined location based upon the movement of a mobile communication device using location-based services.

18 Claims, 8 Drawing Sheets

Related U.S. Application Data (60) Provisional application No. 61/923,511, filed on Jan. 3, 2014.

(51) Int. Cl.
 *H04L 12/28* (2006.01)
 *H04W 4/04* (2009.01)

(52) U.S. Cl.
 CPC ........... *H04W 4/021* (2013.01); *H04W 4/043* (2013.01); *G05B 2219/2642* (2013.01); *H04L 2012/2841* (2013.01)

(56) References Cited

U.S. PATENT DOCUMENTS

| | | | |
|---|---|---|---|
| 2008/0271123 A1* | 10/2008 | Ollis | G08C 17/02 726/4 |
| 2009/0045939 A1* | 2/2009 | Holland | H04W 84/18 340/524 |
| 2011/0148634 A1* | 6/2011 | Putz | G08B 21/22 340/541 |
| 2011/0202185 A1 | 8/2011 | Imes et al. | |
| 2011/0246898 A1 | 10/2011 | Imes et al. | |
| 2012/0172027 A1* | 7/2012 | Partheesh | H04W 4/021 455/420 |
| 2012/0242470 A1 | 9/2012 | Morgan et al. | |
| 2013/0073094 A1 | 3/2013 | Knapton et al. | |
| 2013/0225196 A1 | 8/2013 | James et al. | |
| 2013/0331087 A1* | 12/2013 | Shoemaker | H04L 67/125 455/420 |
| 2014/0167961 A1* | 6/2014 | Finlow-Bates | H04W 4/021 340/541 |
| 2014/0279123 A1* | 9/2014 | Harkey | H04L 67/18 705/26.1 |
| 2014/0378165 A1* | 12/2014 | Jajoo | H04W 4/021 455/456.3 |
| 2015/0094860 A1* | 4/2015 | Finnerty | G05B 15/02 700/275 |
| 2015/0163631 A1* | 6/2015 | Quam | F24F 11/006 455/456.1 |
| 2016/0034050 A1* | 2/2016 | Ady | G06F 1/3231 345/619 |
| 2017/0034656 A1* | 2/2017 | Wang | H04W 4/029 |

OTHER PUBLICATIONS

Chinese Office Action dated Oct. 31, 2018, for CN Application No. 201480053074.X, 10 pages.

Chinese Office Action dated Jul. 10, 2019, for CN Application No. 201480053074.X, 15 pages.

* cited by examiner

SYSTEM AND METHOD FOR DETERMINISTIC CALCULATION OF RECOVERY TIME FOR AN ENVIRONMENTAL SYSTEM

RELATED APPLICATIONS

This application claims priority under 35 U.S.C. § 119 and all other benefits from PCT Application No. PCT/US2014/055164, filed Sep. 11, 2014, which is a continuation-in-part of U.S. patent application Ser. No. 14/153,015, titled "USE OF A GEO-FENCING PERIMETER FOR ENERGY EFFICIENT BUILDING CONTROL", filed on Jan. 11, 2014, that is a continuation-in-part of U.S. patent application Ser. No. 14/040,214, titled "GAMING APPROACH FOR ENERGY EFFICIENT BUILDING CONTROL," filed on Sep. 27, 2013 and provisional U.S. Patent Application Ser. No. 61/923,511, titled "USE OF A GEO-FENCING PERIMETER FOR ENERGY EFFICIENT BUILDING CONTROL," filed on Jan. 3, 2014, all of which are incorporated by reference herein to the extent permitted by law.

FIELD OF THE INVENTION

This application relates to the field of building systems and, more particularly, to interfaces for modification of parameters used in a building automation system in response to movement of a mobile communication device.

BACKGROUND

Building automation systems encompass a wide variety of systems that aid in the monitoring and control of various aspects of building operation. Building automation systems (which may also be referred to herein as "building control systems") include security systems, fire safety systems, lighting systems, and heating, ventilation, and air conditioning ("HVAC") systems. Lighting systems and HVAC systems are sometimes referred to as "environmental control systems" because these systems control the environmental conditions within the building. A single facility may include multiple building automation systems (e.g., a security system, a fire system and an environmental control system). Multiple building automation systems may be arranged separately from one another or as a single system with a plurality of subsystems that are controlled by a common control station or server. The common control station or server may be contained within the building or remote from the building, depending upon the implementation.

The elements of a building automation system may be widely dispersed throughout a facility or campus. For example, an HVAC system includes temperature sensors and ventilation damper controls as well as other elements that are located in virtually every area of a facility or campus. Similarly, a security system may have intrusion detection, motion sensors, and alarm actuators dispersed throughout an entire building or campus. Likewise, fire safety systems include smoke alarms and pull stations dispersed throughout the facility or campus. The different areas or rooms of a building automation system may have different environmental settings based upon the use and personal likes of people in those areas or rooms, such as offices and conference rooms.

Building automation systems typically have one or more centralized control stations in which data from the system may be monitored, and in which various aspects of system operation may be controlled and/or monitored. The control station typically includes a computer or server having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the Apogee® Insight® Workstation, available from Siemens Industry, Inc., Building Technologies Division, of Buffalo Grove, Ill. ("Siemens"), which may be used with the Apogee® building automation system, also available from Siemens. In this system, several control stations connected via an Ethernet or another type of network may be distributed throughout one or more building locations, each having the ability to monitor and control system operation.

The typical building automation system (including those utilizing the Apogee® Insight® Workstation) has a plurality of field panels that are in communication with the central control station. While the central control station is generally used to make modifications and/or changes to one or more of the various components of the building automation system, a field panel may also be operative to allow certain modifications and/or changes to one or more parameters of the system. This typically includes changes to parameters such as temperature and lighting, and/or similar parameters.

The central control station and field panels are in communication with various field devices, otherwise known as "points". Field devices are typically in communication with field panels of building automation systems and are operative to measure, monitor, and/or control various building automation system parameters. Example field devices include lights, thermostats, damper actuators, alarms, HVAC devices, sprinkler systems, speakers, door locks, and numerous other field devices as will be recognized by those of skill in the art. These field devices receive control signals from the central control station and/or field panels. Accordingly, building automation systems are able to control various aspects of building operation by controlling the field devices. Large commercial and industrial facilities have numerous field devices that are used for environmental control purposes. These field devices may be referred to herein as "environmental control devices".

The environmental settings of the environmental control devices have traditionally been set using thermostats and switches located within the environment being controlled. In order to conserve energy a user of the environmental control device may lower the temperature ("turn the heat down") or make other savings to reduce the running cycles of the HVAC system when leaving the room or building. When the user returns to the room or building, they would then "turn the heat up" or make other changes to the environmental controls to make the room or building comfortable. A problem with such an approach is the user is typically present as the building or room adjusts to the new setting.

Such approaches have also been automated with electronic thermostats that "turn the heat down" at predetermined times the users is away during the day and a predetermined times "turn the heat up" when the user is expected to be present. This approach is an improvement over previous approaches, but it is not flexible and when the user's routine changes, the automated settings often have to be manually overridden by the user.

A third approach has enabled users to remotely operate their environmental control devices remotely via internet or other network connections. This allows a user to use a smart device, such as a tablet or cellular telephone to change the settings of the environmental control devices. The drawback with such an approach is that the user is unable to determine what is the optimal time to make changes to the environmental system that would save the most energy and money and at the same time make the room or building comfortable.

While existing building automation systems may allow for users to modify their environment remotely, these approaches do not determine optimal times to make changes to the environmental system to attain increased energy savings while achieving comfort upon entering the room or building. What is needed in the art is an approach that will address these issues and problems identified above.

SUMMARY

In accordance with one embodiment of the disclosure, there is provided an approach for modifying the settings in a building automation in response to stimulus occurring in a predetermined zone and parameters associated with the building automation system.

A building automation system detects the presence of a user in a predetermined geographic area and using parameters associated with a heating, ventilation, and air conditioning (HVAC) system, such as time needed to heat or cool the room to the desired temperature, activates the environmental control system such that the user's desired temperature setting is reached by the time a user enters the room. Upon detecting the user entering the geographic area, the building automation system determines when to activate the environmental control system based on the point in the user's travel in the predetermined geographic area and at times the travel speed of the user in the predetermined geographic area.

The above described features and advantages, as well as others, will become more readily apparent to those of ordinary skill in the art by reference to the following detailed description and accompanying drawings. While it would be desirable to provide an interface system for a building network that provides one or more of these or other advantageous features, the teachings disclosed herein extend to those embodiments which fall within the scope of the appended claims, regardless of whether they accomplish one or more of the above-mentioned advantages.

DESCRIPTION

An example approach for modification of environmental settings upon detection of a person being in a predetermined geographic area or entering/leaving a predetermined geographic area is presented. In the example, the environmental settings of a building automation system (BAS) are modified responsive to notifications received from mobile devices associated with occupants of spaces within a building. When an occupant becomes entitled to occupy a particular space, e.g., a student occupying a college dormitory or a customer checking into a hotel, the occupant downloads a location-based app (such as the geo-fencing perimeter manager module or application 302 shown in FIG. 1) into his or her mobile device. Once activated, the location-based app may periodically determine the location of the occupant's wireless communication device using various location-based services (LBS), which include Global Positioning System (GPS)-based LBS, Global System for Mobile Communications (GSM) localization services, as well as short-range location services such as Bluetooth beacons. In other implementation, other location determination approaches may be used, such as RFID tags that are read by RFID readers that determine a person's location as a person travel around a campus, complex, or building, or even keypads that determine when a person is entering a parking lot or building (assuming the building is large enough to enable the system to determine recovery time for the desired set points of the HVAC system).

Thereafter, the present location of the occupant's mobile communications device as determined by its LBS will be compared with the predetermined geographical perimeter of the occupant's assigned space to determine the distance, if any, between the present location of the occupant's mobile communications device and the predetermined geographical perimeter. If the distance indicates a change in the status of the occupant, i.e., the occupant has either vacated the space or conversely, re-entered the space, then a notification is generated that awakens the mobile communications device, which in turn sends a command to an application server.

The application server may be any type of server operative in cloud-based infrastructures whereby numerous and various remote devices may access services in the cloud through several types of application program interfaces (APIs). In this example approach, the application server receives commands from the mobile communications devices via the mobile communication network and/or 802.11 type network and then may send notifications to the BAS that makes modifications and/or changes to one or more of the various components of the BAS.

Figure 1:
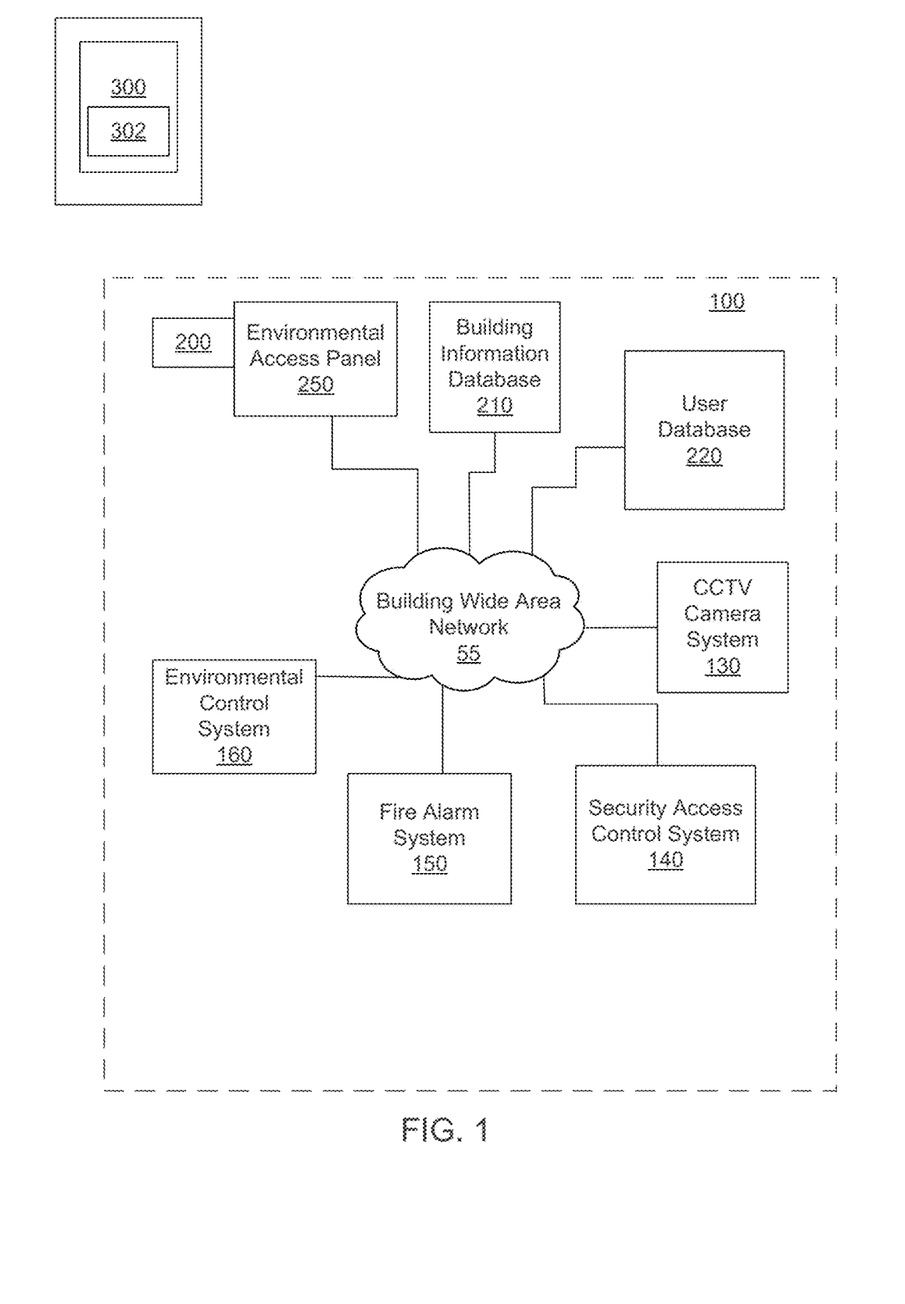
FIG. 1 shows an exemplary topology diagram for a building automation system approach having an environmental control access panel.

With reference to FIG. 1, an exemplary topology diagram for a building automation system approach is shown. The building wide area network 55 includes a plurality of systems and components in wired or wireless communication. The building wide area network 55 generally includes a plurality of building automation systems and may be accessed via a "building synergistic interface system" or "BSIS". The BSIS 200 may be in signal communication with one or more mobile computing devices 300 (sometimes referred to as smart devices or mobile communication devices such as devices 504, 506, 508 and 510 shown in FIG. 5) that are able to communicate with the BSIS 200 that may be part of an environmental control access panel 250.

Examples of smart devices or mobile computing devices 300 include smart cellular telephones, notebook and laptop computers, pad computers, eBook readers, and digital music players, such as iPods®.

The BSIS 200 further may include access to a data storage device comprising a building information database 210 and a user database 220. Software for communicating environmental and other data to the BSIS 200 may be stored on both the mobile computing device 300 and/or the building automation system 100. As will be explained herein, the BSIS 200 enables one or more of the environmental settings in a building automation system to be adjusted based on human actions without a network connection between the mobile computing device 300 and the BSIS 200. In addition, as described in further detail herein, the mobile computing device 300 may include a geo-fencing perimeter manager module or application 302 that enables the mobile computing device 300 to (i) derive and/or identify a geo-fence perimeter associated with a pre-determined location of a building space or room managed by the building automation system 100 or 540, and (ii) generate notifications to the building automation system 100 (or 540 in FIG. 5) to inform the system 100 or 540 of changes in the status of the location of the respective mobile computing device 300 relative to the geo-fence perimeter associated with a building space or room.

In the following pages, the general arrangement of an exemplary building automation system 100 configured for use with the BSIS 200 is explained first. Thereafter, the general arrangement of the environmental control access panel 250 is explained followed by the general arrangement of the mobile computing device 300. Overall operation of the BSIS 200 is discussed following the description of the building automation system (BAS), environmental access control panel 250, and the mobile computing device 300.

Figure 2:
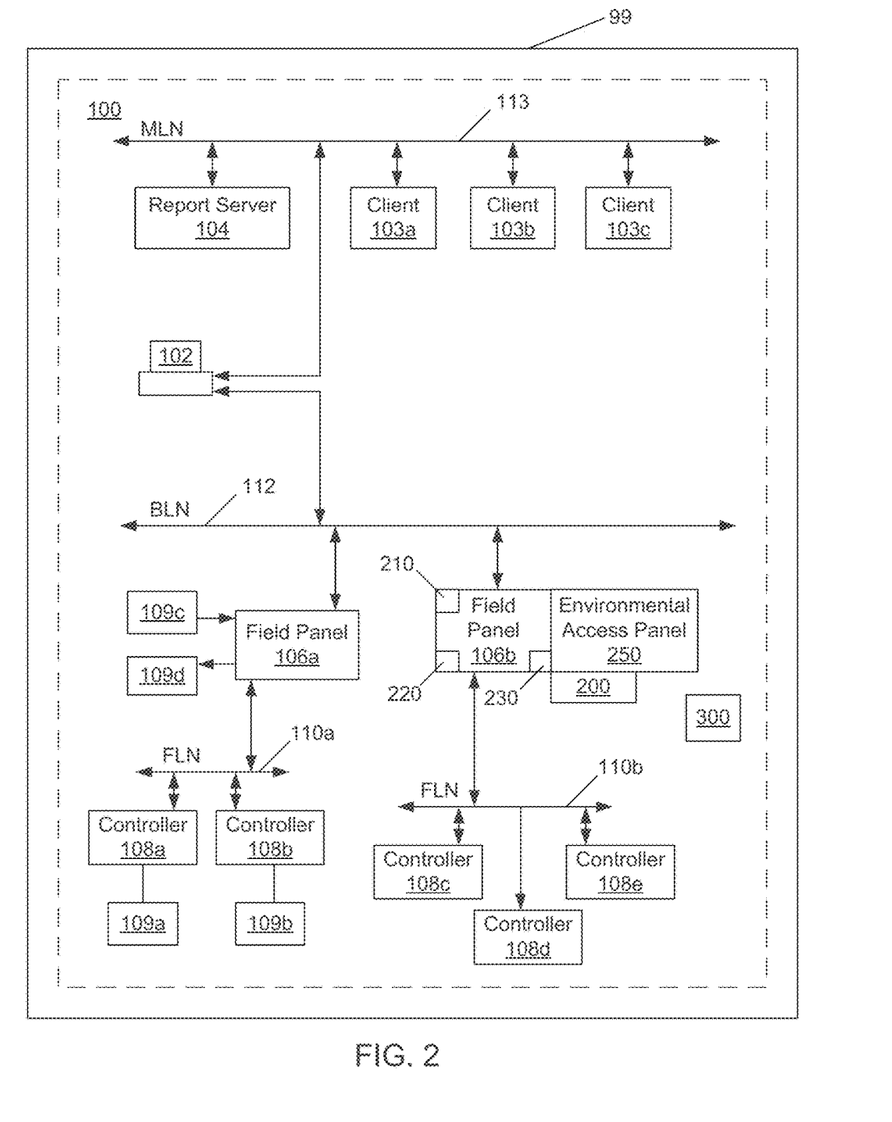
FIG. 2 shows an exemplary block diagram of a building automation system of the building network of FIG. 1.

In the example embodiment of FIG. 1, the BAS 100 includes a building information database 210, user database 220, closed circuit television system 130, a security system 140, a fire alarm system 150, and an environmental control system 160. In FIG. 2, a system block diagram of an exemplary building automation system (BAS) 100 within a building or campus is depicted. The BAS is depicted as a distributed building system that provides control functions for any one of a plurality of building operations, such as environmental control, security, life or fire safety, industrial control and/or the like. An example of a BAS is the Apogee® building automation system available from Siemens Industry, Inc., Building Technologies Division, of Buffalo Grove, Ill. The Apogee® building automation system allows the setting and/or changing of various controls of the system, generally as provided below. While a brief description of an exemplary BAS is provided in the paragraphs below, it should be appreciated that the BAS 100 described herein is only an exemplary form or configuration for a building automation system.

With particular reference to FIG. 2, the BAS 100 includes at least one supervisory control system or workstation 102, client workstations 103a-103c, report server 104, a plurality of field panels represented by field panels 106a and 106b, and a plurality of controllers represented by controllers 108a-108e. It will be appreciated, however, that wide varieties of BAS architectures may be employed.

Each of the controllers 108a-108e represents one of a plurality of localized, standard building control subsystems, such as space temperature control subsystems, lighting control subsystems, or the like. Suitable controllers for building control subsystems include, for example, the model TEC (Terminal Equipment Controller) available from Siemens Industry, Inc., Building Technologies Division, of Buffalo Grove, Ill. To carry out control of its associated subsystem, each controller 108a-108e connects to one or more field devices, such as sensors or actuators, shown by way of example in FIG. 2 as the sensor 109a connected to the controller 108a and the actuator 109b connected to controller 108b.

Typically, a controller such as the controller 108a affects control of a subsystem based on sensed conditions and desired set point conditions. The controller controls the operation of one or more field devices to attempt to bring the sensed condition to the desired set point condition. By way of example, consider a temperature control subsystem that is controlled by the controller 108a, where the actuator 109b is connected to an air conditioning damper and the sensor 109a is a room temperature sensor. If the sensed temperature as provided by the sensor 109a is not equal to a desired temperature set point, then the controller 108a may further open or close the air conditioning damper via actuator 109b to attempt to bring the temperature closer to the desired set point. It is noted that in the BAS 100, sensor, actuator and set point information may be shared between controllers 108a-108e, the field panels 106a and 106b, the workstation 102 and any other elements on or connected to the BAS 100.

To facilitate the sharing of such information, groups of subsystems such as those connected to controllers 108a and 108b are typically organized into floor level networks or field level networks ("FLNs") and generally interface to the field panel 106a. The FLN data network 110a is a low-level data network that may suitably employ any suitable proprietary or open protocol. Subsystems 108c, 108d and 108e along with the field panel 106b are similarly connected via another low-level FLN data network 110b. Again, it should be appreciated that wide varieties of FLN architectures may be employed.

The field panels 106a and 106b are also connected via building level network ("BLN") 112 to the workstation 102 and the report server 104. The field panels 106a and 106b thereby coordinate the communication of data and control signals between the subsystems 108a-108e and the workstation 102 (operating as a supervisory computer) and report server 104. In addition, one or more of the field panels 106a, 106b may themselves be in direct communication with and control field devices, such as ventilation damper controllers or the like. To this end, as shown in FIG. 2, the field panel 106a is coupled to one or more field devices, shown for example as a sensor 109c and an actuator 109d.

The workstation (server in other implementations) 102 provides overall control and monitoring of the BAS 100 and includes a user interface. The workstation 102 may further operate as a BAS data server that exchanges data with various elements of the BAS 100. The BAS data server can also exchange data with the report server 104. The BAS data server 102 allows access to the BAS system data by various applications. Such applications may be executed on the workstation 102 or other supervisory computers (not shown).

With continued reference to FIG. 2, the workstation 102 is operative to accept modifications, changes, alterations and/or the like from the user. This is typically accomplished via a user interface of the workstation 102. The user interface may include a keyboard, touch screen, mouse, or other interface components. The workstation 102 is operable to, among other things, affect or change operational data of the field panels 106a, 106b as well as other components of the BAS 100. The field panels 106a and 106b utilize the data and/or instructions from the workstation 102 to provide control of their respective controllers.

The workstation 102 is also operative to poll or query the field panels 106a and 106b for gathering data. The workstation 102 processes the data received from the field panels 106a and 106b, including trending data. Information and/or data is thus gathered from the field panels 106a and 106b in connection with the polling, query or otherwise, which the workstation 102 stores, logs and/or processes for various uses. To this end, the field panels 106a and 106b are operative to accept modifications, changes, alterations and/or the like from the user.

The workstation 102 also preferably maintains a database associated with each field panel 106a and 106b. The database maintains operational and configuration data for the associated field panel. The report server 104 stores historical data, trending data, error data, system configuration data, graphical data and other BAS system information as appropriate. In at least one embodiment, the building information database 210 and the user database 220 may be accessed by the BSIS 200 via the BAS server 102. In other embodiments the building information database 210 and the user database 220 may be stored elsewhere, such as workstation 102.

The management level network ("MLN") 113 may connect to other supervisory computers and/or servers, internet gateways, or other network gateways to other external devices, as well as to additional network managers (which in turn connect to more subsystems via additional low level data networks). The workstation 102 may operate as a supervisory computer that uses the MLN 113 to communicate BAS data to and from other elements on the MLN 113. The MLN 113 may suitably comprise an Ethernet or similar wired network and may employ TCP/IP, BACnet, and/or other protocols that support high speed data communications.

FIG. 2 also shows that the BAS 100 may include a field panel 106b that is shown in FIG. 2 as a housing that holds the building information database 210, the user database 220, and the environmental access panel 250 having BSIS 200. The mobile computing device 300 is configured for wireless communications with the BAS 100 via the environmental access panel 250 provided on the field panel 106b. While the foregoing BSIS members are shown in FIG. 2 as being associated with one of the field panels 106b, it will be recognized that in other embodiments these and other BSIS members may be differently positioned in or connected to the BAS 100. For example, the building information database 210 and the user database 220 of the BSIS could be provided on the workstation 102. Alternatively, the building information database 210 and the user database 220 could be housed separately from those components shown in FIG. 2, such as in a separate computer device that is coupled to the BLN 112 or other BAS location. Such a separate computer device could also be used to store BSIS operational software. Similarly, the environmental access panel 250 with BSIS 200 may be housed within the workstation 102 or within a separate computer device coupled to the BLN 112 of the BAS.

Figure 3:
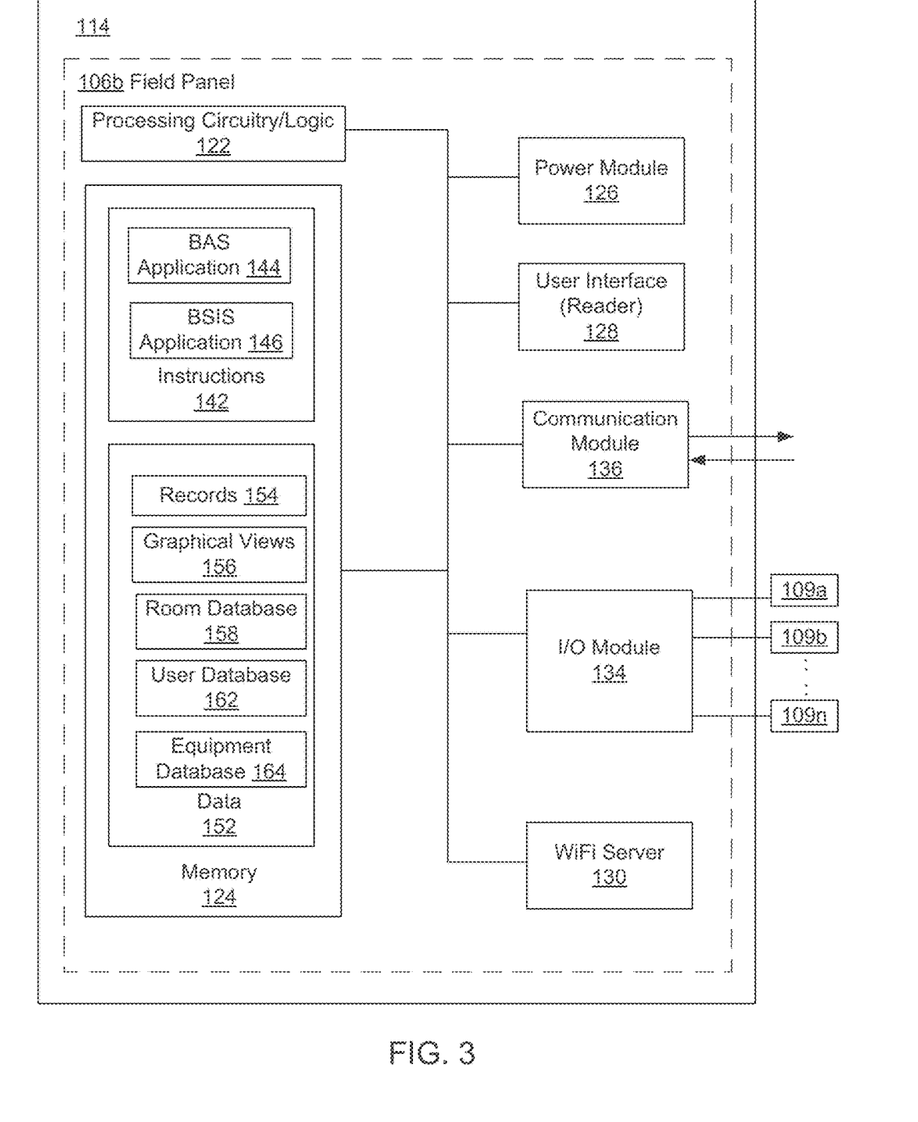
FIG. 3 shows an exemplary internal block diagram of a field panel for the building automation system of FIG. 2.

With reference now to FIG. 3, a block diagram of an exemplary embodiment of the field panel 106b of FIG. 2 is shown. It should be appreciated that the embodiment of the field panel 106b is only an exemplary embodiment of a field panel in a BAS 100 coupled to the BSIS 200. As such, the exemplary embodiment of the field panel 106b of FIG. 3 is a generic representation of all manners or configurations of field panels that are operative in the manner set forth herein.

The field panel 106b of FIG. 3 includes a cabinet or the like 114 that is configured in a typical manner for a building automation system field panel. The field panel 106b includes processing circuitry/logic 122, memory 124, a power module 126, a user interface 128, an I/O module 134, a BAS network communications module 136, and the Wi-Fi server 130.

The processing circuitry/logic 122 is operative, configured and/or adapted to operate the field panel 106b including the features, functionality, characteristics and/or the like as described herein. To this end, the processing circuitry logic 122 is operably connected to all of the elements of the field panel 106b described below. The processing circuitry/logic 122 is typically under the control of program instructions or programming software or firmware contained in the instructions 142 area of memory 124, explained in further detail below. In addition to storing the instructions 142, the memory also stores data 152 for use by the BAS 100 and/or the BSIS 200.

The field panel 106b also includes a power module 126 that is operative, adapted and/or configured to supply appropriate electricity to the field panel 106b (i.e., the various components of the field panel). The power module 126 may operate on standard 120 volt AC electricity, but may alternatively operate on other AC voltages or include DC power supplied by a battery or batteries.

An input/output (I/O) module 134 is also provided in the field panel 106b. The I/O module 134 includes one or more input/output circuits that communicate directly with terminal control system devices such as actuators and sensors. Thus, for example, the I/O module 134 includes analog input circuitry for receiving analog sensor signals from the sensor 109a, and includes analog output circuitry for providing analog actuator signals to the actuator 109b. The I/O module 134 typically includes several of such input and output circuits.

The field panel 106b further includes a BAS network communication module 136. The network communication module 136 allows for communication to the controllers 108c and 108e as well as other components on the FLN 110b, and furthermore allows for communication with the workstation 102, other field panels (e.g., field panel 106a) and other components on the BLN 112. To this end, the BAS network communication module 136 includes a first port (which may suitably be a RS-485 standard port circuit) that is connected to the FLN 110b, and a second port (which may also be an RS-485 standard port circuit) that is connected to the BLN 112.

The field panel 106b may be accessed locally. To facilitate local access, the field panel 106b includes an interactive user interface 128. Using user interface 128, the user may control the collection of data from devices such as sensor 109a and actuator 109b. The user interface 128 of the field panel 106b includes devices that display data and receive input data. Reception of input data may include a code reader device, such as a Quick Response (QR) code reader. These devices may be devices that are permanently affixed to the field panel 106b or portable and moveable. The user interface 128 may also suitably include an LCD type screen or the like, and a keypad. The user interface 128 is operative, configured and/or adapted to both alter and show information regarding the field panel 106b, such as status information, and/or other data pertaining to the operation, function and/or modifications or changes to the field panel 106b.

As mentioned above, the memory 124 includes various programs that may be executed by the processing circuitry/logic 122. In particular, the memory 124 of FIG. 3 includes a BAS application 144 and a BSIS building application 146. The BAS application 144 includes conventional applications configured to control the field panel 106b of the BAS 100 in order to control and monitor various field devices 109a-n of the BAS 100. Accordingly, execution of the BAS application 144 by the processing circuitry/logic 122 results in control signals being sent to the field devices 109a-n via the I/O module 134 of the field panel 106b. Execution of the BAS application 144 also results in the processor 122 receiving status signals and other data signals from various field devices 109a-n, and storage of associated data in the memory 124. In one embodiment, the BAS application 144 may be provided by the Apogee® Insight® BAS control software commercially available from Siemens Industry, Inc. or another BAS control software.

In addition to the instructions 142, the memory 124 may also include data 152. The data 152 includes records 154, graphical views 156, a room database 158, a user database 162, and an equipment database 164. The records 154 include current and historical data stored by the field panel 106b in association with control and operation of the field devices 109a-n. For example, the records 154 may include current and historical temperature information in a particular room of the building 99, as provided by a thermistor or other temperature sensor within the room. The records 154 in the memory may also include various set points and control data for the field devices 109, which may be pre-installed in memory 124 or provided by the user through the user interface 128. The records 154 may also include other information related to the control and operation of the 100 BAS and BSIS building application 146, including statistical, logging, licensing, and historical information.

The graphical views 156 provide various screen arrangements to be displayed to the user via the user interface 128. The user interface 128 may be displayed at thermostats with displays or other user access points having displays, such as liquid crystal displays, light emitting diode displays, or other known types of visual displays devices.

The room database 158 may include data related to the layout of the building 99. This room database 158 includes a unique identifier for each room or area within the building (e.g., room "12345"). In addition to the unique identifier data, the room database 158 may include other information about particular rooms or areas within the building 99. For example, the room database 158 may include information about field devices located within the room or area, particular equipment (e.g., research equipment, manufacturing equipment, or HVAC equipment) positioned within the room or area. The room database 158 may also include GPS coordinates (e.g., latitude, N or S, and latitude, E or W, in degrees, minutes, and seconds) from which geographical perimeters may be derived or calculated for each room or area within a building).

The user database 162 may include data related to human users who frequent the building 99. Accordingly, the user database 162 may include a unique identifier for each human user (e.g., user "12345") and a user profile associated with that user. In other implementations, each room or area may have a profile that has one or more users associated with it. The user profile may include information provided by the user or provided by third parties about the user. For example, the user profile may include a preferred temperature or lighting level for the user, which is provided to the user database 162 by the user. Also, the user profile may include a security clearance level, room access, or data access for the user, all provided to the database 162 by a third party, such as the human resources department or security department for the employer who owns the building 99. Moreover, the user profile may include data related to the term and nature of the user's occupancy of an associated room or area, e.g., a move-in date, a move-out date, etc.

The equipment database 164 may include data related to various pieces of equipment within the building 99. The equipment may include field devices associated with the BAS 100 or other equipment that is positioned within the building 99. For example, the equipment database 164 may include information related to manufacturing or research equipment located in a particular room of the building. The equipment database 164 maintains a unique identifier for each piece of equipment (e.g., equipment "12345") and data associated with that equipment. For example, the database 164 may associate particular schematics, operation manuals, photographs, or similar data with a given piece of equipment within the database 164.

While the field panel 106b has been explained in the foregoing embodiment as housing the BSIS building application 146 and various BSIS databases, such as the room database 158, user database 162, and equipment database 164, it will be recognized that these components may be retained in other locations in association with the BAS 100. For example, these components could all be retained within the central workstation 102 of the BAS 100 or a separately designated BSIS computing device in the BAS 100.

Figure 4:
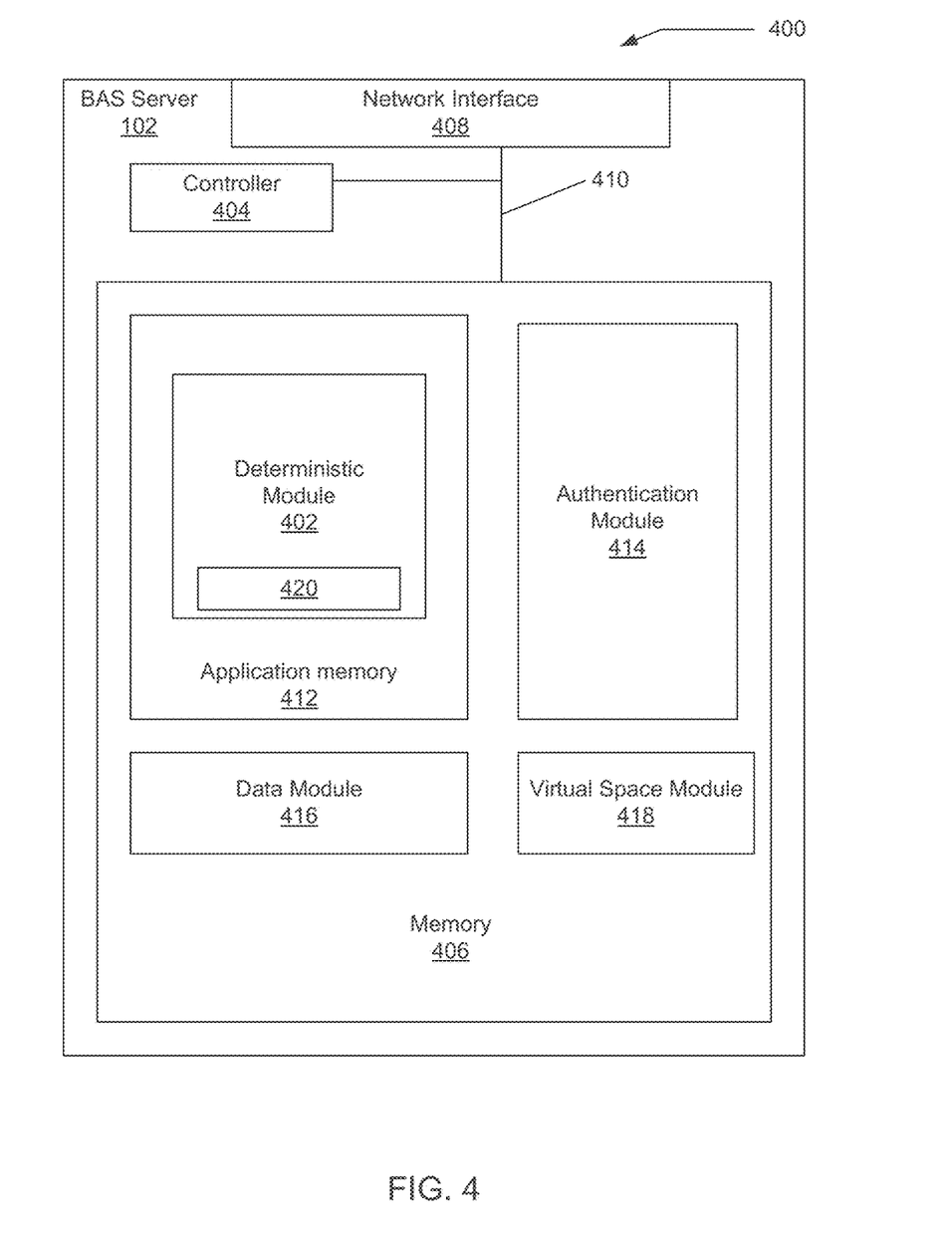
FIG. 4 shows an exemplary block diagram of a building automation system server for the building automation system of FIG. 2 with a scoring feedback module.

Turning to FIG. 4, an exemplary block diagram 400 of BAS server 102 of FIG. 2 with a deterministic module 402 is illustrated. The deterministic module 402 acquires multiple environmental data points over times that are stored in a data set. The BAS server 102 has a controller 404 that executes machine-readable instructions stored in memory or accessed via the network. Examples of a controller 404 may include a microprocessor having one or more cores, microcontroller, application-specific integrated circuit (ASIC), digital signal processor, digital logic devices configured to execute as a state machine, analog circuits configured to execute as a state machine, or a combination of the above. The controller 404 is typically electronically coupled to memory 406, network interface 408 and other parts of the server via one or more buses (represented as bus 410). The memory 406 may be random access memory, SDRAM, DIMM, or other types of digital storage capable of read/write access. The network interface 408 is an Ethernet network connection in the current implementation. In other implementations, additional or other types of data network interfaces may be employed.

Within the memory 406, there may be areas for applications 412, authentication module 414, data module 416, and virtual space module 418. One of the applications or modules that may be stored and executed from the application memory 412 is the deterministic module 402. In addition to the deterministic module 402, other BAS applications (not shown in FIG. 4) may be stored and executed in the application memory 412.

The authentication module 414 may contain user identification information, such as login, permission, expiration time, email address, and location information. A person accessing a BAS 100 with an external device, such as a computer, smart phone, or other personal computing device to change an environmental parameter may be required to log into the BAS 100. The authentication and user information for accessing the BAS 100 may reside in the authentication module 414. In other implementations, the authentication module 414 may be distributed among multiple servers and databases, implemented on a standalone server, or combined with other modules.

The virtual space module 418 may contain a database or data structure that maps or groups points in the BAS 100 into groups that may represent physical rooms, such as a dorm room, conference room, or similar location. Virtual locations may also be defined, such as a grouping of cubicles in an office and a grouping of rooms. Both the physical locations and the virtual locations may have their respective GPS coordinates included in the virtual space module 418 from which geographical perimeters may be derived or calculated for each physical location and virtual location within a building. The virtual space module 418 may be accessed by the authentication module 414 and an association created between users and groups of points (i.e., virtual spaces). The associations are stored in the current example in the authentication module 414. In other implementations the associations may be stored in the deterministic module 402, data module 416, the virtual space module 418, or on a different server.

The data module 416 is an area of memory for storing data and variables used by applications in the application memory. The data module 416 may also contain data used by the hardware of the BAS server 102.

Figure 5:
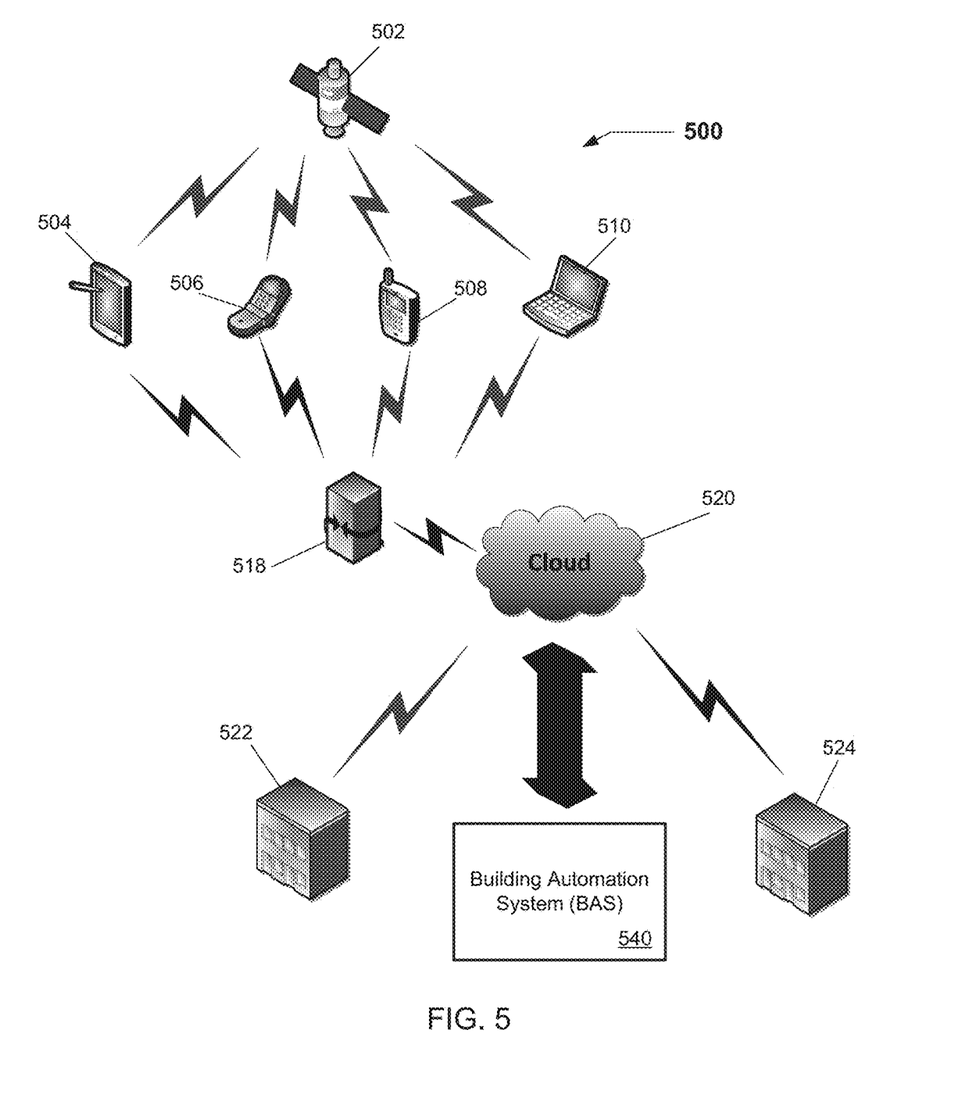
FIG. 5 shows an exemplary topology diagram of a cloud-based approach for connecting numerous remote devices with the building automation system of FIG. 2.

Turning to FIG. 5, an exemplary topology diagram of a cloud-based approach for connecting numerous remote mobile communications devices with the building automation system of FIG. 2 is shown. These remote mobile communications devices (MCDs) may include a tablet computer 504, such as an iPad®, a cell phone 506, a Smartphone 508, such as an iPhone®, and a laptop computer 510. All of these remote mobile communications devices in the current example may be in signal communication with satellite 502 and GPS-enabled to determine the location of each respective remote mobile communications device. Other location determination approaches may be used with or in place of the GPS-enabled location determination approach, such as using WiFi or RFID tags to determine a location of a device.

The remote mobile communications devices 504-510 are connected to a gateway server 518, which in turn connects to an Internet-based infrastructure (or "cloud") 520. The gateway server 518 enables remote mobile communications devices connections to a corporate network that includes the BAS 540 from the Internet without having to set up virtual private network (VPN) connections. In some implementations, the mobile communications device (MCD) may send messages to the building automation system via the cloud 520 indicating messages are waiting. The building automation system 540 then retrieves the waiting message a short time later. The messages are then processed and commands issued to points in field panel 106b. Through the Internet-based infrastructure 520, the remote mobile communications devices are able to utilize certain applications and services (such as geo-fencing perimeter manager 302) that allow these remote mobile communications devices to generate notifications to BAS 540 that inform BAS 540 of changes in the status of the location of each mobile communications device relative to its user's associated building space.

The BAS may also be in communication, through the cloud 520, with one or more buildings, in FIG. 5 shown as building "A" 522 and building "B" 524. Rooms and spaces in these building may be defined as a location in terms of GPS coordinates and stored by the BAS 540 (consistent with the BAS 100 as described herein) in the room database 158 of the field panel 106a or 106b associated with the building "A" 522 or building "B" 524 having the respective room or space. The BAS 540 may also store, in association with the GPS location or coordinates of the space or room in the same room database 158, pre-determined perimeter parameters such as one or more dimensions of the respective room or space and/or a corresponding perimeter definition such as an algorithm for deriving a perimeter. The stored perimeter parameters and GPS location or coordinates of the space or room collectively define perimeter data from which geographical perimeters (also referred to as a "geo-fencing perimeter") may be derived or calculated for each room or area within a building by the BAS 540 or by the occupant's personal MCD in communication with the BAS 540 via the network or Internet-based infrastructure or cloud 520 in accordance with methods of operation further described herein. Once derived or calculated, these geo-fencing perimeters may stored by the BAS 540 into the room database 158 of field panel 106b of FIG. 3 as well as building information database 210 of the BAS 540 consistent with the BAS 100 shown in FIG. 1.

In a method of operation, once occupants are assigned to any of these rooms or spaces, i.e., have a right to occupy or to enter these rooms and/or spaces, information related to these occupants may be entered into the user database 162 of field panel 106b of FIG. 3 and user database 220 of FIG. 1. This information may include associating each user with his/her room or space and also information related to the occupant's personal mobile communications device, examples of which include devices 504, 506, 508, and 510 of FIG. 5. Once the occupant is authenticated to the BAS 540, changes in the location of the personal mobile communications device (MCD) relative to the occupied room or space causes or prompts the geo-fencing perimeter manager module or application 302 of the MCD to generate a corresponding notification to the BAS 540, which in turn leads the BAS 540 to automatically modify and adjust environmental settings of the BAS 540 as shown in more detail in FIG. 6.

It is appreciated by those skilled in the art that the cloud-based approach shown in FIG. 5 is only an exemplary topology diagram of a cloud-computing methodology and that for the purpose of connecting numerous remote devices with a building automation system, a cloud-based implementation may take other forms and include other components, such as internal and external firewalls, Web servers, proxy servers, and the like.

Figure 6:
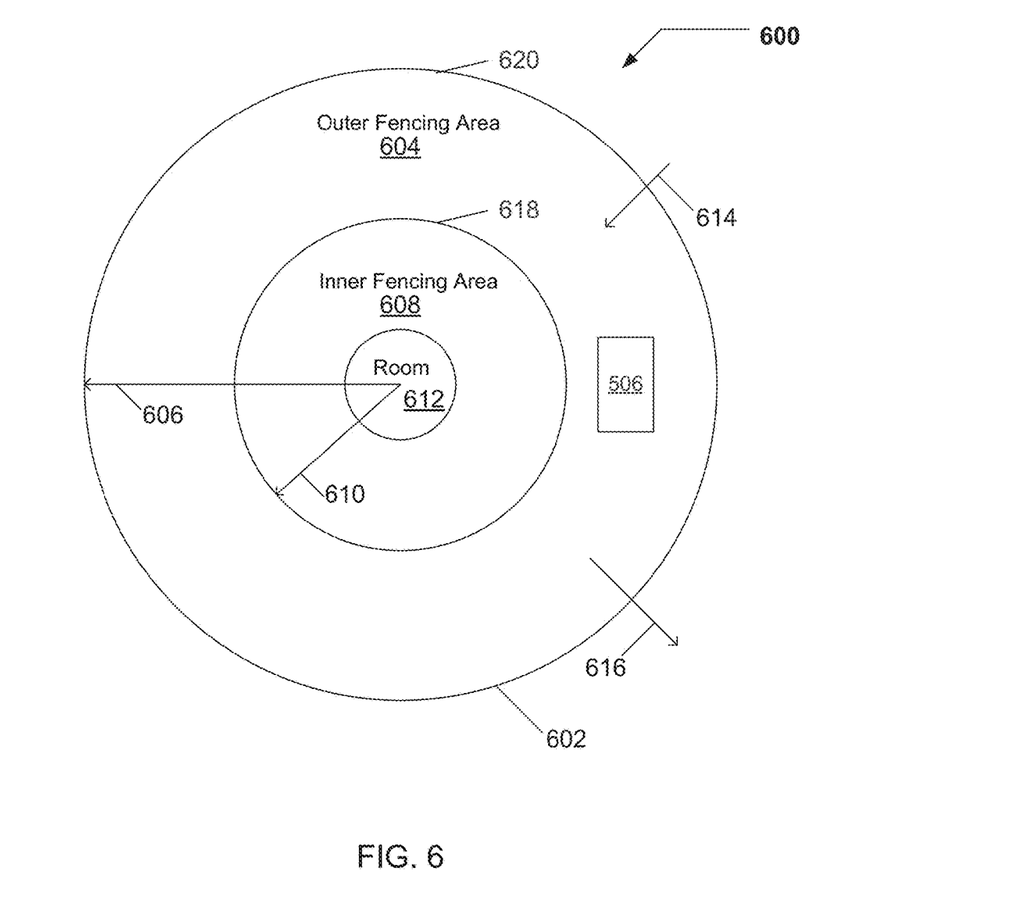
FIG. 6 shows an exemplary diagram of predetermined geo-fencing area around a room controlled by the building automation system of FIG. 2.

In FIG. 6, an exemplary diagram 600 of predetermined geo-fencing area 602 around a room 612 controlled by the BAS of FIG. 2 is shown. The geo-fencing area 602 may be subdivided into additional fencing areas defined by geo-fencing perimeters, such as a first geo-fencing area (outer fencing area) 604 that has a first radius 606 and a second geo-fencing area (inner fencing area) 608 having a second radius 610. In the current example, the first radius may be 0.1 miles and the second radius may be 0.2 miles. In other implementations additional subdivided geo-fencing areas may be employed. In yet other implementations, geo-fencing areas defined by geo-fencing perimeters may employ other geographies other than circles.

When the last occupant is detected leaving a room 612 (or building depending upon the implementation) the BAS 100 may adjust the settings of the HVAC system in order to save energy (i.e., reduce heat in the winter and air cooling in the summer) and the room may be considered in a power saving mode. When an MCD (e.g., cell phone 506) is detected crossing a geo-fencing perimeter 614 such as the outer geo-fencing perimeter of the outer geo-fencing area 604 of a room 612 that is in a power saving mode and heading towards the room 612, the BAS 100 is notified (i.e., by the MCD) and records a parameter indicating when the perimeter of the outer geo-fencing area 604 was crossed. If the direction of the user travel is toward the room 612, the BAS (100) then calculates the estimated time of arrival of the user at the room 612. That time is then compared to the recovery time needed for the environmental control system to operate to make the room temperature of the room 612 reach the user's desired setting by the time of the user's arrival.

The BAS 100 using the deterministic module 402 of FIG. 4 may use deterministic approaches for calculating recovery times associated with an environmental control system to prepare the environment for occupants. During operation of the environmental control system, multiple environmental and HVAC system controlled variable data points over time may be taken and stored by the deterministic module 402 in a data set. For example, air flow in CFMs, room temperature, supply air temperature, and outside air temperature may be stored and associated with a set point, such as desired temperature. Multiple data sets may exist in the deterministic module 402. For example, a data set for a set point of 72 degrees when the outside temperature is between 80-90 degrees may be a first data set and a second data set may be for a set point of 75 degrees when the outside air temperature is between 80-90 degrees. Thus, multiple data sets may exist within the deterministic module 402.

The data sets are then used in the deterministic module 402 to derive or otherwise calculate a recovery time for the environmental control system. The data sets may include multiple real time operating data from the room (predetermined area) under various operating conditions. Once acquired, the data from the environmental control system's sensors may be converted into delta time and average operating thermal conditions. The delta time and average operating thermal condition data may then be used to generate a mathematical model of the environmental control systems' operation. From the mathematical model, the recovery time may be derived. A benefit of the mathematical model approach being generated from actual operating data sets acquired from the room is that the effects of the internal load and changes in air flow are accounted for in the mathematical model. Examples of data sets may include grouping of data for "in-room" set point at 72 degrees and air temperature between 80-90 degrees Fahrenheit. The data may include date, time, air flow, room temperature supply air temperature, and outside air temperature. Additional data sets may be for other "set points" and outside temperature ranges.

If the data in the data sets includes time taken to recover (Δtime), room temperature ($T_{room}$), temperature at set point ($T_{set\ point}$), temperature of supply air ($T_{supply\ air}$), and temperature of outside air ($T_{outside\ air}$), then the recovery time (RT) for the collected data set may be expressed as:

$$RT = K^*[T_{room} - T_{set\ point}]$$

where K is the constant representing Mime to achieve the delta temperature difference ($T_{room} - T_{set\ point}$) of one degree. The recovery time may be expressed in a series of vectors as:

$$[RT] = [K] \begin{bmatrix} \Delta time \\ T_{supply} \\ T_{outside\ air} \\ T_{room} \\ T_{set\ point} \end{bmatrix}.$$

This may be rewritten as an equation to determine [K]:

$$[K] = \left[\frac{[RT]}{[T]}\right]^{-1}.$$

The resulting model for [K] may then be used to determine the recovery time for the current conditions ($T_{room}$, $T_{supply\ air}$, $T_{outside\ air}$, $T_{set\ point}$). The vector [K] can be computed from prior samples of vector [T] and corresponding computed vector of [RT] at different times. Once [K] is known, it can be used to predict [RT]. It should also be noted here that [K] can be updated from time-to-time reflecting any physical changes that may take place with the room or mechanical systems. The determination of recovery time may also be expressed as a non-linear mathematical formula:

RECOVERY TIME=NON-LINEAR FUNCTION OF (REQUIRED DELTA ROOM TEMP, SUPPLY AIR TEMP, OUTSIDE AIR TEMP)

Thus, an equation for recovery time may be stated in the form of:

RECOVERY TIME=$K1+K2$*DELTA ROOM TEMP+$K3$*SUPPLY AIR TEMP+ $K4$*OUTSIDE AIR TEMP where: DELTA ROOM TEMP="in-room" temperature set point–ROOM TEMP. The "K" terms are constants associated with operation of the environmental control system to handle the internal thermal load of the room. The change in room temperature is the change for the current room temperature to the desired room temperature.

In addition to the recovery time, the BAS 100 also calculates the speed of the user approaching the room 612. The speed of the user approaching the room can be calculated from the rate of change in GPS location of the MCD (i.e., cell phone 506). In some implementations a second boundary may be employed. The speed and the distance from the room may then be used to determine the arrival time of the user in the room. With an estimate of the user arrival time, current time, and recovery time identified, the BAS 100 can calculate the time to activate the environmental control system to achieve the user's desired temperature setting by the time the user arrives in the room. The act of activating the HVAC system could include, but not be limited to, turning on the fan at maximum speed and changing the temperature setpoint of the controller (i.e., controller 108a in FIG. 2) to the user's desired temperature setting. The advantage of such an approach is that energy is not wasted by having the room fully recovered to the desired temperate before the user is expected to be at the room.

In another implementation, the dynamic boundary 618 may be dynamically established based upon the users travel speed outside of the inner fencing area 608. In this approach, only one boundary 618 is required and the area outside of that boundary 618 may be considered the outer fencing area. Thus, the dynamic boundary may be periodically updated at predetermined times or upon triggering events (i.e., every few minutes, detection of movement of the user).

In yet another implementation, the recovery time determination may occur as soon as the user crosses the outer boundary 620, as the speed and direction of travel of the user may be determined via the GPS. The HVAC system then uses the recovery time determination to identify at what time the HVAC system needs to activate in order to achieve the desired set points (i.e., temperature, humidity, and lighting) for the users arrival.

In the current implementation, the fencing areas for each specific room may also be dynamically adjusted. The approach for dynamically adjusting the fencing areas may be based on the characteristics of the specific system that serves the room and the typical travel speed of the user who is the occupant of that room. The first step is to determine recovery times of the specific HVAC equipment to achieve targeted controlled variables (i.e., set points) that serves the room. The system capability to achieve targeted controlled variables is a function of several factors including system efficiency, age, capacity, and loading. Initially, a minimum recovery time may be arbitrarily set for the type of HVAC system. As the HVAC system ages and filters get dirty, the recovery time will change and will become unique and specific to the piece of equipment or system which serves that specific room. Characterizing the minimum recovery time may be accomplished with feedback and analysis of the controlled variables monitored as previously described in paragraph [0069].

The second step may be to determine the typical travel speed of the user who is the occupant of the room. This can be accomplished by keeping records of the time a user typically takes to travel across the fencing areas. A typical travel speed of the user can then be calculated by averaging time and distance recorded over time. As the minimum recovery times to achieve targeted controlled variables are characterized, through feedback and analysis of the variables monitored and analyzed, the fencing areas may be dynamically adjusted to better accommodate the system's actual performance and actual user travel speeds.

Such an approach dynamically accommodates:

(1) A poor performing system may require more time to achieve its targeted set point requiring expanding the boundary to allow for additional recovery time.

(2) A well performing system may require less time to achieve its targeted set point requiring reducing the boundary to allow the system adequate required recovery time but enhancing the energy savings capabilities of the system.

(3) A fast moving user who will arrive at the space sooner results in expanding the boundary based on user's speed to allow adequate time of recovery.

(4) A slow moving user who will arrive at the space later requires reducing the boundary to allow the system the required recovery time but enhancing the energy savings capabilities of the system. Such variation of implementation make it possible to dynamically adjust fencing areas for each specific room for specific occupants of the room, thus, satisfying their comfort requirements, improving system operation, and saving energy at the same time.

Figure 7:
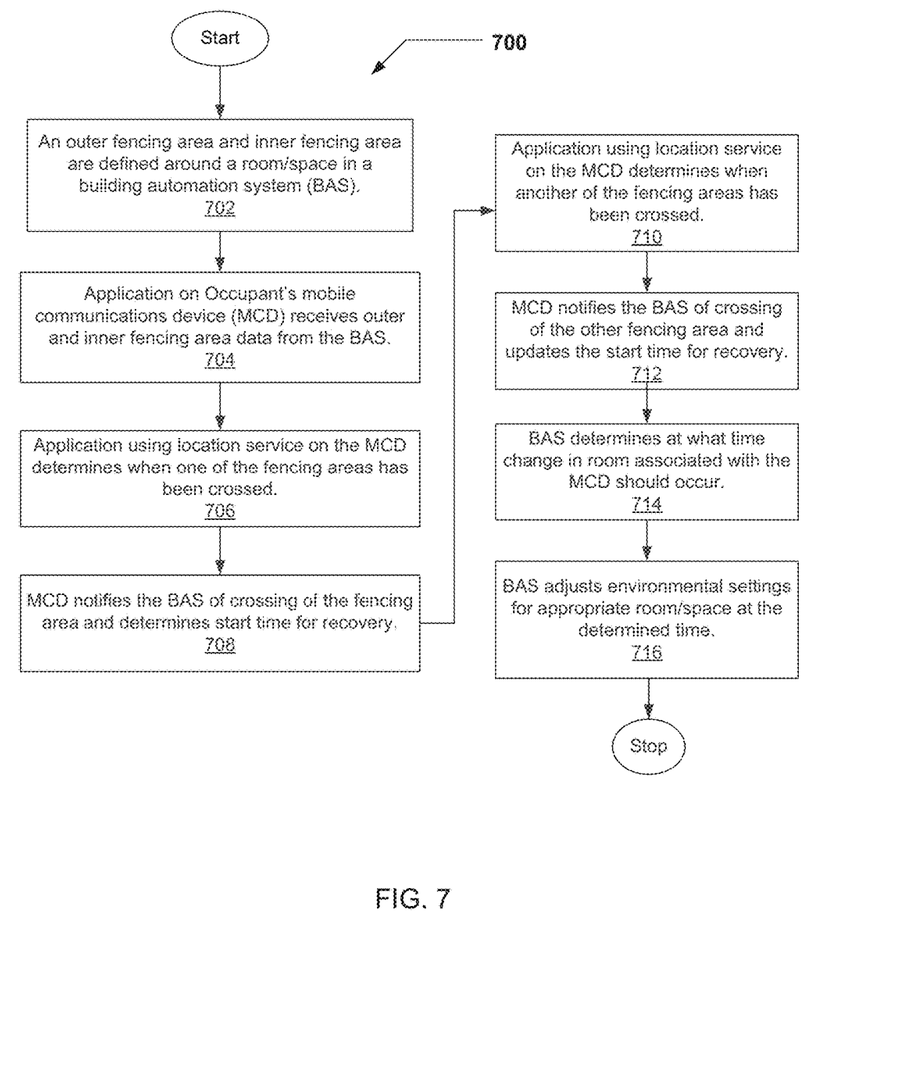
FIG. 7 illustrates a flow diagram of an approach for adjusting building automation system parameters for a room in response to the predetermined geo-fencing areas of FIG. 6 being crossed.

In FIG. 7, a flow diagram 700 of an approach for adjusting BAS 100 parameters for a room 612 in response to the predetermined geo-fencing areas 608 and 604 of FIG. 6 being crossed is illustrated. An outer geo-fencing area 604 and inner geo-fencing area 608 are defined around a room/space in the BAS 100 in step 702. Application that has previously been loaded on users MCD (i.e., cell phone 506) receives outer and inner fencing area data from the BAS 100 in step 704. The application using location services on the MCD determines when one of the fencing areas has been entered or a boundary crossed in step 706. The location services of the MCD may include GPS, cell tower triangulation, or other location determination approaches associated with a smart device. The MCD notifies the BAS 100 of the entry or crossing of the boundary of a geo-fencing area 604 or 608 and calculates start time for recovery in step 708. The application using location servers on the MCD determines another geo-fencing area has been entered or boundary crossed in step 710. The MCD notifies the BAS 100 of the other area being entered or boundary crossed and recalculates the recovery time in step 712. In other implementations, the start time for recovery may be periodically updated.

In response to the two geo-fencing areas being entered or boundaries crossed, the BAS 100 is able to identify if the MCD is going away from the room or moving towards the room and changes the mode of the room appropriately in step 714. The speed of the MCD is also ascertainable. If the MCD is moving away from the room 612 and no one is detected in the room by the BAS 100, the room (i.e., the equipment supporting the room) may be placed into an energy saving mode and the temperature of the room changed. If the MCD is moving towards the room 612, the BAS 100 determines an estimated time of arrival at the room and determines the optimal time to start environmental recovery for the room (i.e., places the room in a recovery mode) in step 716.

Figure 8:
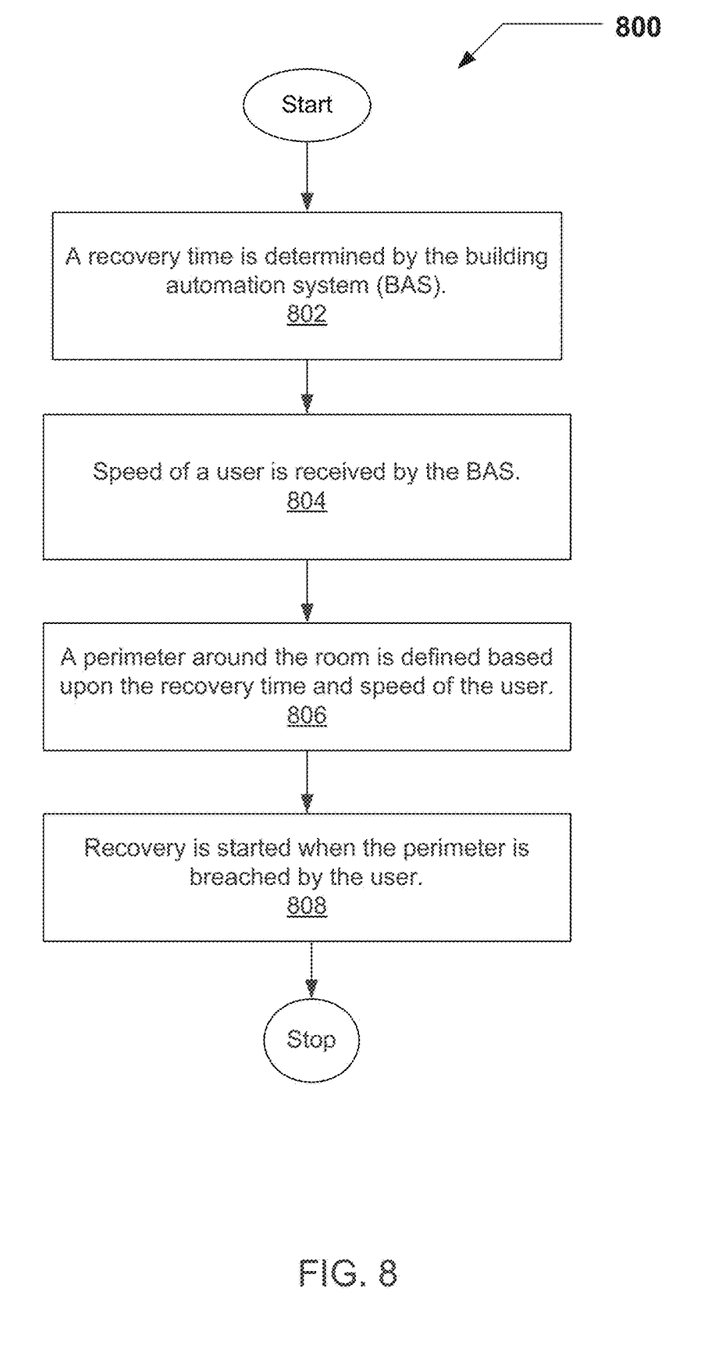
FIG. 8 illustrates a flow diagram of an approach for adjusting building automation system parameters for a room in response to a single geo-fencing area being crossed.

FIG. 8 illustrates a flow diagram of an approach for adjusting BAS parameters for a room in response to a single geo-fencing area being crossed. The BAS 100 and/or environmental control system determines the recovery time for the predetermined area (i.e., a room) in step 802. The speed a user is traveling may be determined via a GPS-enabled mobile communication device in step 804. The user's speed may be used along with the recovery time to determine a geo-fencing perimeter. A formula that uses distance traveled per unit of time may be used to determine the time needed to reach the predetermined area. Once the time needed for recovery, and the time needed for the user to reach the predetermined area are known, then a perimeter may be established around the predetermined area at a distance associated with the recovery time in step 806. In step 808, recovery of the desired environment starts when the perimeter of the geo-fencing area is breached or otherwise crossed.

It will be understood and appreciated that one or more of the processes, sub-processes, and process steps described in connection with FIG. 7 and FIG. 8 may be performed by hardware, software, or a combination of hardware and software on one or more electronic or digitally-controlled devices. The software may reside in an application memory in a suitable electronic processing component or system such as, for example, one or more of the functional systems, devices, components, modules, or sub-modules schematically depicted in the BAS server 102 of FIG. 4. The application memory may include an ordered listing of executable instructions for implementing logical functions (that is, "logic" that may be implemented in digital form such as digital circuitry or source code or in analog form such as an analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read-only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

What is claimed is:

1. A method of adjusting control devices of a building automation system (BAS), the method including the steps of:
   determining recovery time for an environmental control system that is in a first energy mode for a predetermined location;
   generating a first geo-fencing perimeter, where the first geo-fencing perimeter defines a predetermined area and associated with movement and proximity of a user and the recovery time;
   generating a second geo-fencing perimeter, where the second geo-fencing perimeter encompasses the first geo-fencing perimeter;
   determining a travel speed from a travel time and a travel distance the mobile communications device travels between the second geo-fencing perimeter and the first geo-fencing perimeter;
   calculating a return time based upon the travel speed and a distance to the predetermined location; and
   changing the environmental control system from the first energy mode to a second energy mode based upon the return time.

2. The method of claim 1, where the proximity of the first geo-fencing perimeter is determined by a crossing of the first geo-fencing perimeter.

3. The method of claim 1 includes, determining the proximity to the first geo-fencing perimeter with location information from a mobile communications device carried by the user that is configured to communicate with the BAS.

4. The method of claim 3, where determining the proximity of the first geo-fencing perimeter further includes identifying the proximity of the first geo-fencing perimeter at the mobile communications device.

5. The method of claim 3, where determining the proximity of the first geo-fencing perimeter further includes identifying the proximity of the first geo-fencing perimeter at the BAS using the location information from the mobile communications device.

6. The method of claim 1, where determining the recovery time of the environmental system uses historical operational data associated with operation of the environmental system and the predetermined location.

7. The method of claim 1, includes placing the predetermined location in the first energy mode when a user leaves the predetermined location.

8. The method of claim 1, includes detecting that no one is in the predetermined location; and
   placing the predetermined location in the first energy mode.

9. A system for adjustment of control devices in a building automation system (BAS), comprising:
   a processor in an environmental control system that determines a recovery time for a predetermined location that is in a first energy mode when changed to a second energy mode a first geo-fencing perimeter defines a predetermined area and generated by the processor, where the first geo-fencing perimeter is associated with the recovery time,
   a second geo-fencing perimeter generated by the processor that encompasses the first geo-fencing perimeter,
   a travel speed derived from a travel time and a travel distance the mobile communications device travels between the second geo-fencing perimeter and the first geo-fencing perimeter, and
   a return time calculated from a travel time and a distance to a predetermined location, where the environmental control system changes from the first energy mode to the second energy mode based upon the return time.

10. The system of claim 9, where the proximity of the first geo-fencing perimeter is determined by the BAS detection of the first geo-fencing perimeter being crossed by the mobile communications device.

11. The system of claim 9, where the proximity to the first geo-fencing perimeter is determined with location information from a mobile communications device that is configured to communicate with the BAS.

12. The system of claim 11, where the proximity of the first geo-fencing perimeter determination further includes identification of the proximity of the first geo-fencing perimeter at the mobile communications device.

13. The system of claim 11, where the proximity of the first geo-fencing perimeter determination further includes identification of the proximity of the first geo-fencing perimeter with a processor in the BAS using the location information from the mobile communications device.

14. The system of claim 9, where the recovery time of the environmental system uses historical operational data associated with operation of the environmental system and the predetermined location.

15. The system of claim 9, includes the predetermined location being placed in the first energy mode when a user leaves the predetermined location.

16. The system of claim 9, includes at least one sensor that detects that no one is in the predetermined location; and
   placing the predetermined location in the first energy mode in response to detection of no one in the predetermined location.

17. A non-transient computer-readable medium with a plurality of instructions for a method of adjusting control devices of a building automation system (BAS), the instructions including the steps of:

determining recovery time for an environmental control system that is in a first energy mode for a predetermined location;

generating a first geo-fencing perimeter, where the first geo-fencing perimeter defines a predetermined area and associated with movement and proximity of a mobile communications device and the recovery time;

generating a second geo-fencing perimeter that encompasses the first geo-fencing perimeter;

determining a travel speed from a travel time and a travel distance the mobile communications device travels between the second geo-fencing perimeter and the first geo-fencing perimeter;

calculating a return time based upon the travel speed and a distance to the predetermined location; and changing the environmental control system from the first energy mode to a second energy mode based upon the return time.

18. The non-transient computer-readable medium with a plurality of instructions for a method of adjusting control devices of a building automation system (BAS) of claim 17, where the proximity of the first geo-fencing perimeter is crossing the first geo-fencing perimeter.

\* \* \* \* \*